June 23, 1970  G. H. JONES ETAL  3,516,328
MACHINE TOOL WITH LONGITUDINALLY ADJUSTABLE AND
HYDRAULICALLY CLAMPED ROTARY MACHINING SPINDLE
Filed July 12, 1968  5 Sheets-Sheet 1

Inventors
Gordon H. Jones
Steven E. Klabunde
By: Olson, Trexler, Wolters & Bushnell attys

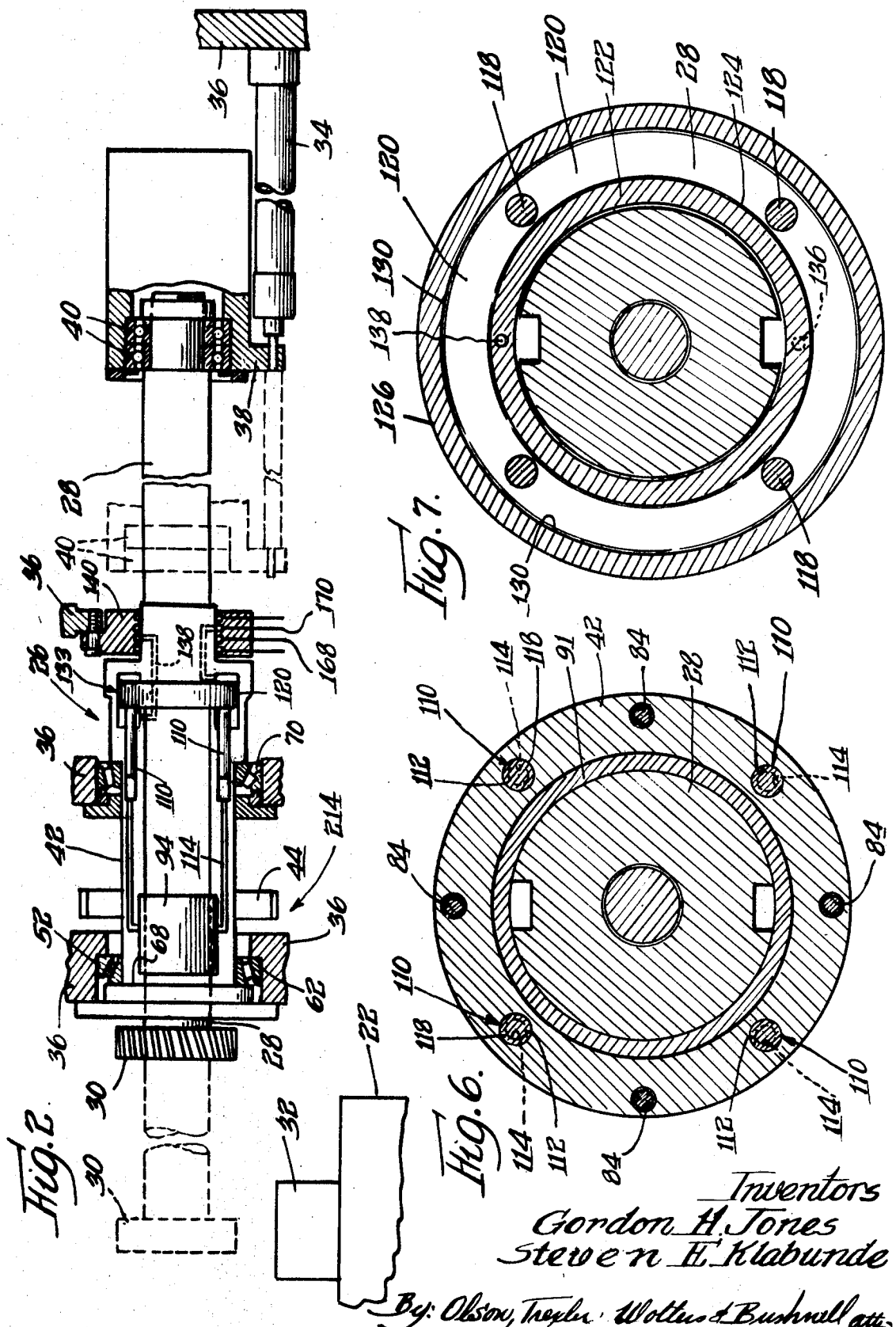

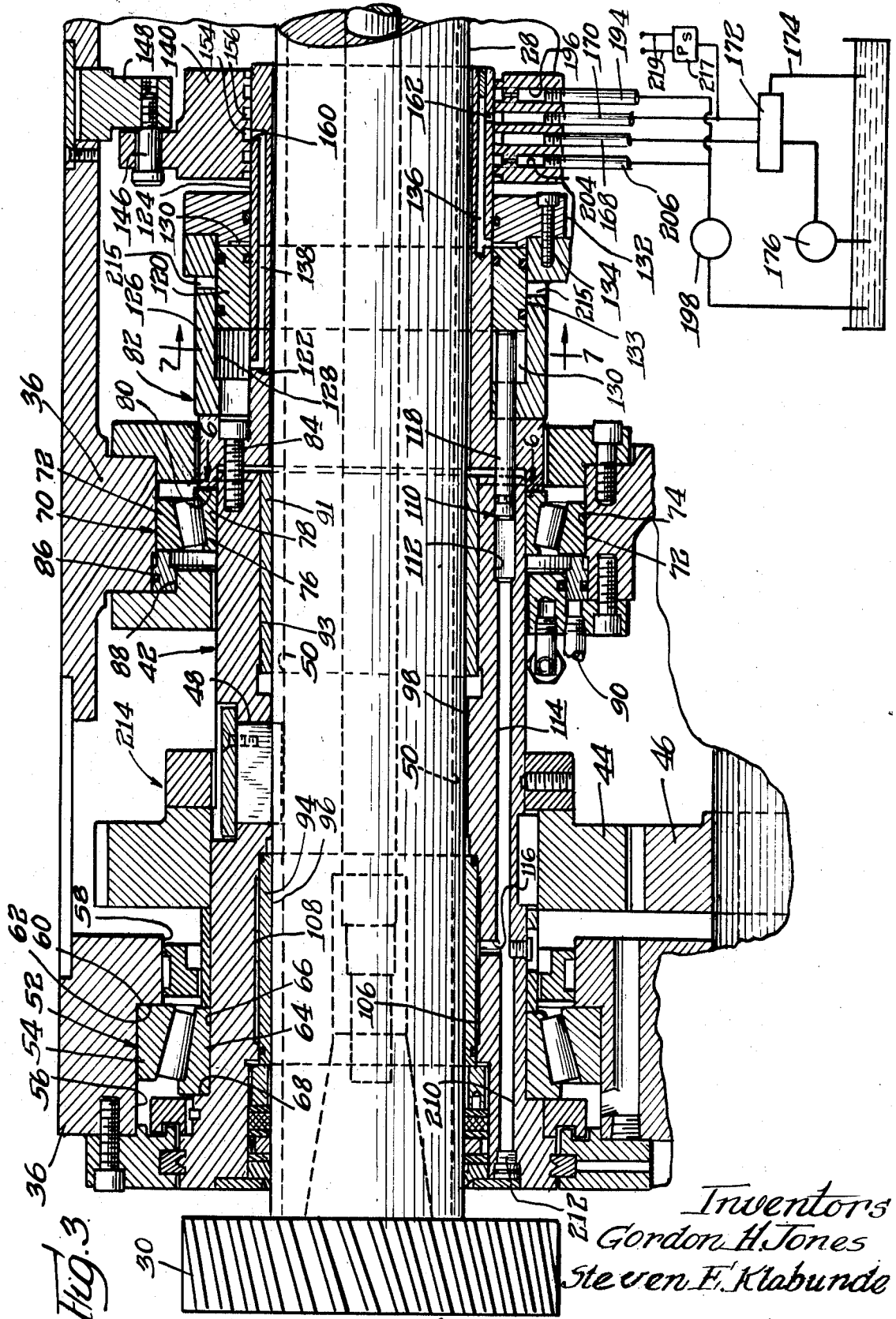

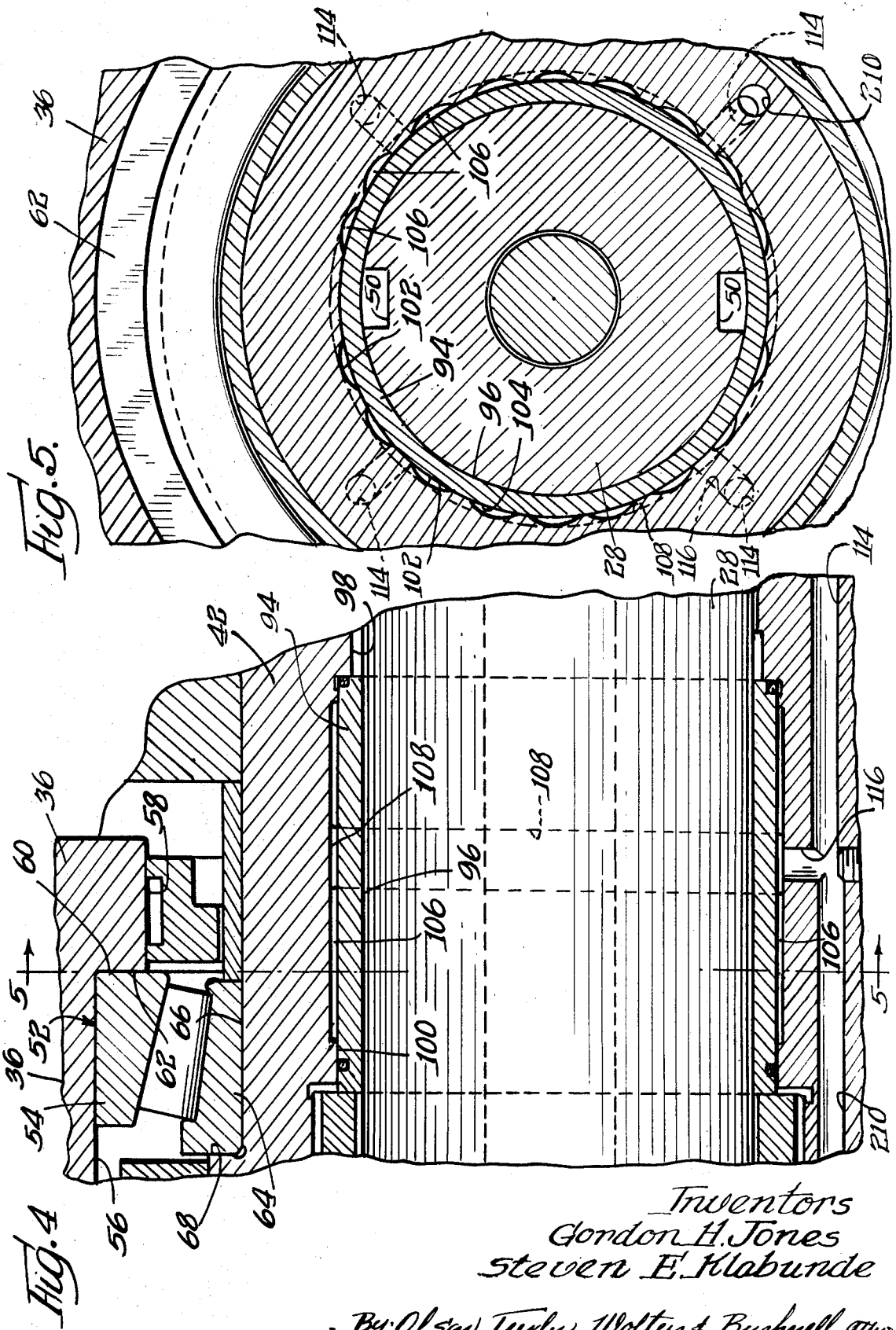

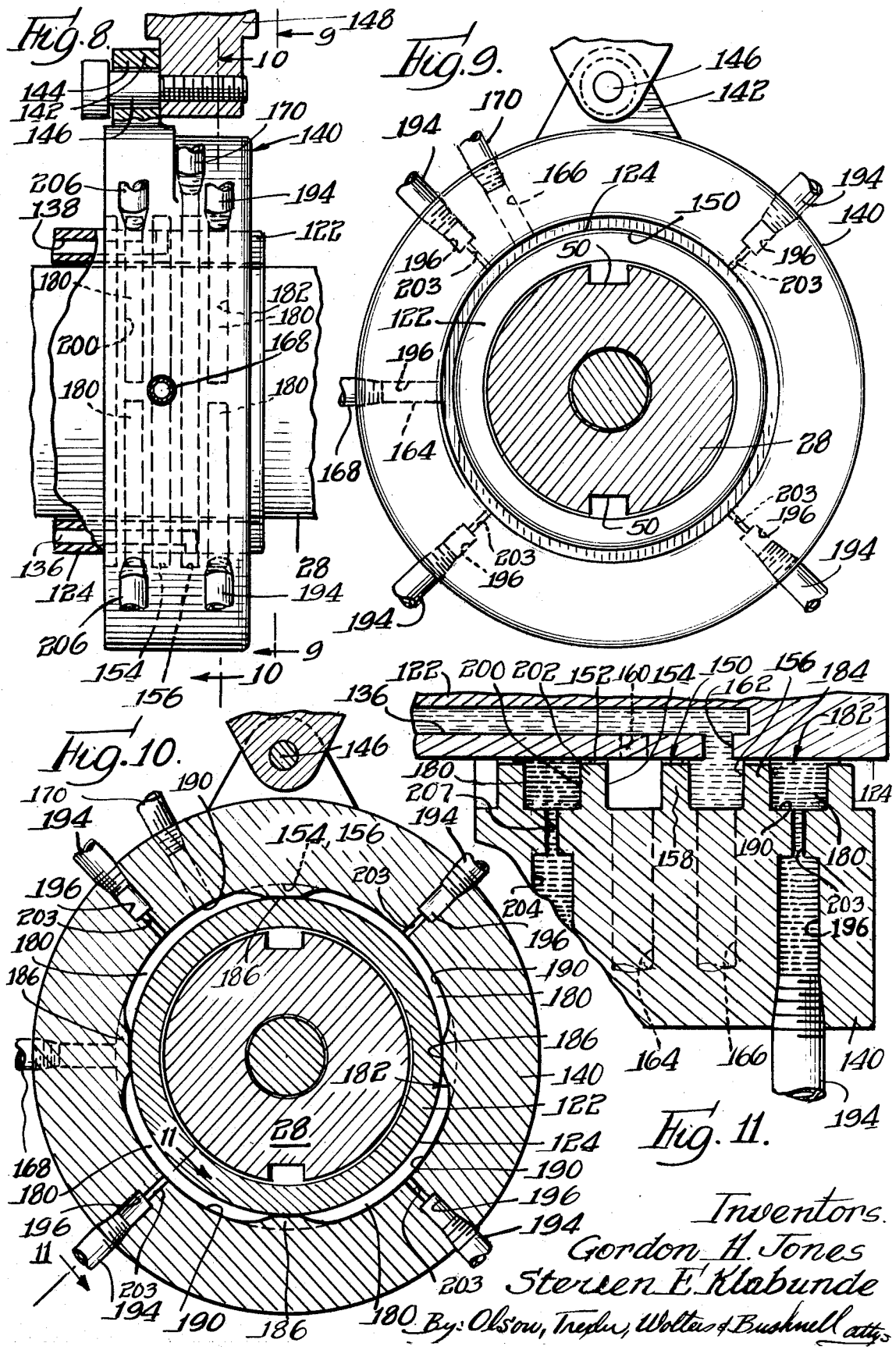

United States Patent Office 3,516,328
Patented June 23, 1970

3,516,328
MACHINE TOOL WITH LONGITUDINALLY ADJUSTABLE AND HYDRAULICALLY CLAMPED ROTARY MACHINING SPINDLE
Gordon H. Jones, Van Dyne, and Steven E. Klabunde, Fond du Lac, Wis., assignors to Giddings & Lewis, Inc., Fond du Lac, Wis., a corporation of Wisconsin
Filed July 12, 1968, Ser. No. 744,572
Int. Cl. B23c 1/12; F16l 27/12
U.S. Cl. 90—11                                      14 Claims

ABSTRACT OF THE DISCLOSURE

A machine tool comprising a machining spindle adjustably extensible longitudinally within a rotary support sleeve and releasably clamped to the sleeve by a clamping bushing applied by high pressure hydraulic energizing means positioned on the spindle sleeve in such manner that application of the clamping bushing does not change the load on precision bearing means used to support and precisely locate the sleeve radially and axially and does not apply significant axial stress to the structure that functions to determine the axial position of the spindle to the end that the spindle is clamped for rotation precisely in the exact axial position desired. The clamping bushing has an axial position proximate a precision bearing that locates the sleeve and spindle axially with precision and the high fluid pressure clamp energizing structure that rotates with the sleeve and energizes the clamp hydraulically is situated on the sleeve so that the portion of the sleeve that determines axially location of the spindle is effectively isolated from significant axial stresses incident to clamping of the spindle. High pressure clamp energizing means rotatable with the sleeve is energized by fluid under relatively low pressure fed to the rotary sleeve assembly by a fluid supply collar which permits high speed rotation of the sleeve without wear or deterioration of the structure.

This invention relates to machine tools and more particularly to machine tools in which machining is performed by a tool carried by a rotary spindle that can be extended adjustably from a rotary driving support or sleeve for the spindle to an infinite number of operating positions to properly locate the driven cutting tool in relation to the workpiece to be machined.

Machine tools of this character can be quite large to accommodate massive workpieces. However, the large size of workpieces and the correspondingly large size of the machine tools does not license comprises in the accuracy with which surfaces must be machined on the workpieces.

The objective of maintaining close tolerances in the machining of even large workpieces can be seriously complicated by any lack of precision in or any source of error attending the operation of machines of this character to clamp the extensible spindle in any particular working position to which it is longitudinally adjusted.

This invention stems from a perception that prior machine tools of this character have inherent shortcomings that have included small yet significant errors in the longitudinal positioning of the spindle arising from significant longitudinal displacement of the spindle incident to clamping of the spindle to its supporting sleeve after it has been adjusted longitudinally to a desired working position.

While a skilled machinist exercising care and precautions may possibly compensate to a certain extent for errors which have tended to accompany operation of prior machines, the presence of this tendency to error in prior machines creates operational problems and difficulties which must be taken into account in the control of such machines either by an operator or by automatic means if machining operations are to be performed with precision.

One object of the invention is to provide an improved machine tool of this character that provides for quick and easy control of the machine to adjust the machining spindle longitudinally to any desired working position within its range of adjustment and to clamp the spindle hydraulically for rotation in the working position to which it is adjusted in a manner which effectively eliminates error in the positioning of the spindle as an incident to hydraulic energization of the machine to hydraulically clamp the spindle in the working position to which it is adjusted.

In a machine tool constructed in accordance with the invention, the machining spindle is adjusted longitudinally within an encircling spindle sleeve that serves as a rotary support for the spindle when the machine is in operation. The spindle sleeve itself is supported for rotation by precision bearing means in such manner that the axial position of the rotary spindle sleeve is determined with great accuracy.

It is an object of the invention to provide an improved machine tool of this character in which the spindle is strongly clamped to the encircling spindle sleeve by hydraulically actuated structure on the sleeve in a manner which avoids changing the load on the precision support bearing for the sleeve and which avoids the application of significant axial stress to the structure of the sleeve that functions to determine the axial position of the spindle to the end that hydraulic operation of the machine tool to clamp the spindle does not disturb or affect the precisely determined axial position of the structure on the spindle sleeve which functions to hold the spindle with equal precision in the exact axial position to which it is initally adjusted.

Another object of the invention is to provide a machine tool of the character recited having improved, compact and highly advantageous spindle clamping means that is hydraulically energized to strongly clamp the longitudinally adjusted spindle for rotation in the precise axial position to which it is longitudinally preadjusted.

A further object is to provide a machine tool as recited which uses energizing fluid under low pressure to actively energize a rotary spindle clamping assembly rotatable with the spindle sleeve and functioning to clamp the spindle hydraulically by fluid under very high pressure.

Still another object is to provide a machine tool of the character recited in which a new and improved spindle clamping assembly is incorporated with the spindle sleeve in such manner that the working parts of the assembly move in relation to each other only as an incident to clamping and unclamping of the spindle.

A further object is to provide a machine tool of the character recited in which a high fluid pressure spindle clamping assembly incorporated with the spindle sleeve and rotatable with the spindle sleeve is positively energized by energizing fluid under much lower pressure advantageously fed to the rotary assembly from a non-rotating fluid supply source through coacting parts hydraulically maintained in concentric working relation to each other in a manner that eliminates mechanical friction and wear on the coacting parts and which facilitates rotation of the machining spindle at normal machining speeds, including those in high machining speed ranges.

In conjunction with the preceding objects, a further object is to provide an improved machine tool of the character recited which has a long service life.

Other objects and advantages will become apparent from the following description of the exemplary embodiment of the invention illustrated in the drawings, in which:

FIG. 2 is a simplified and partially schematic sectional view taken generally with reference to the line 2—2 of FIG. 1 showing the machining spindle in retracted position in solid lines and illustrating an extended working position on the spindle in phantom lines;

FIG. 3 is a sectional view on an enlarged scale corresponding to the medial portion of FIG. 2 and illustrating in greater detail components of the structure used to clamp and support the machining spindle for rotation in the working position to which it is adjusted;

FIG. 4 is a fragmentary sectional view corresponding to the left end portion of FIG. 3 and showing on a still larger scale the relationship of structure used to support the machining spindle for rotation in the precise axial position to which it is adjusted;

FIG. 5 is a transverse fragmentary sectional view taken with reference to the line 5—5 of FIG. 4;

FIG. 6 is a fragmentary transverse sectional view taken with reference to the line 6—6 of FIG. 3;

FIG. 7 is a fragmentary transverse sectional view taken with reference to the line 7—7 of FIG. 3;

FIG. 8 is a fragmentary elevational view showing on an enlarged scale the fluid supply collar or collector ring which supplies clamp energizing fluid to the rotary assembly of FIG. 3 as shown at the right-hand end of FIG. 3;

FIG. 9 is a fragmentary transverse sectional view taken with reference to the line 9—9 of FIG. 8;

FIG. 10 is a fragmentary sectional view taken with reference to the line 10—10 of FIG. 8; and FIG. 11 is a fragmentary radial sectional view on a much enlarged scale taken with reference to the line 11—11 of FIG. 10.

Figure 1:
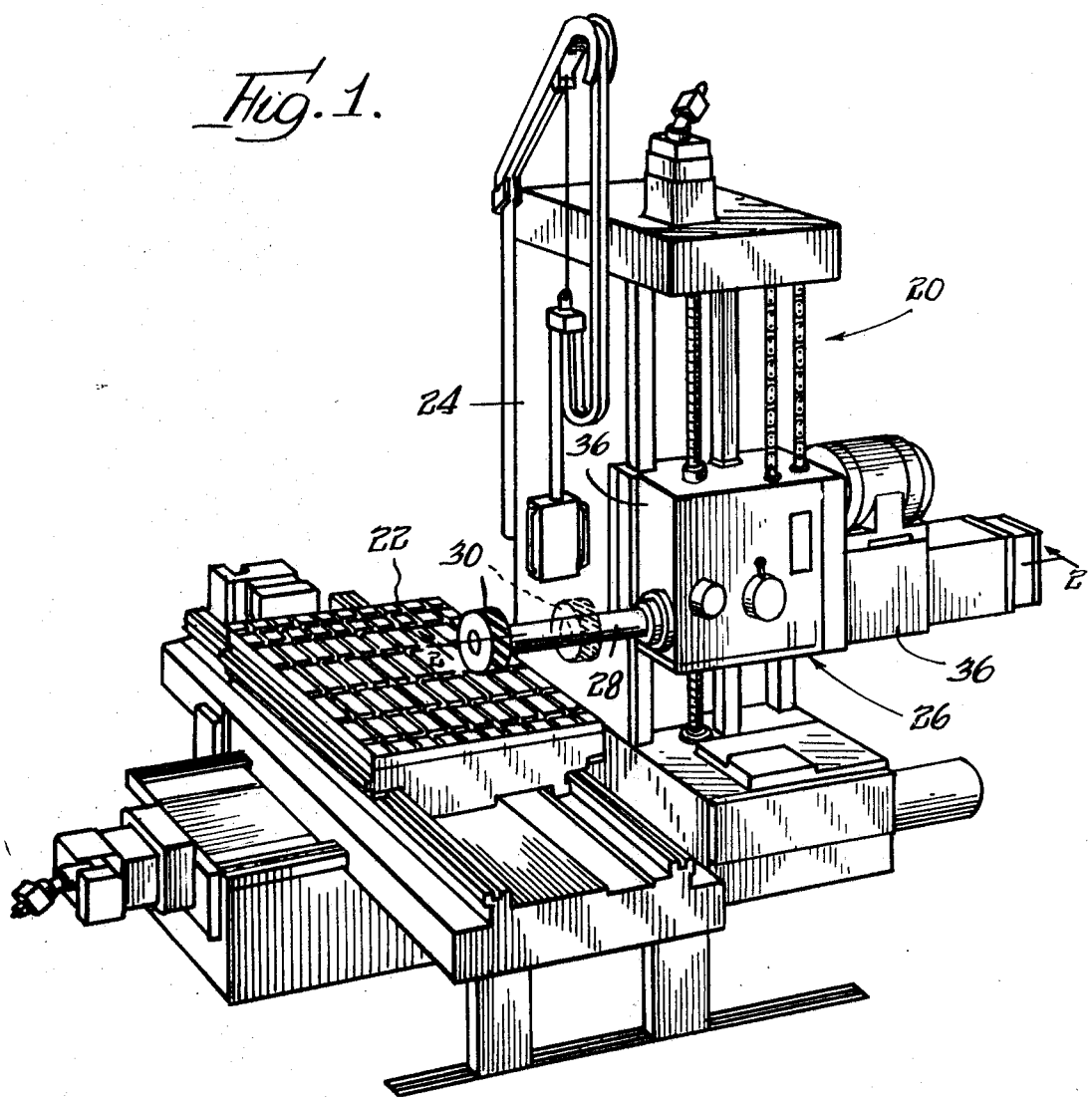
FIG. 1 is a perspective view of a machine tool embodying the invention.

It will be appreciated by those skilled in the art that a number of alterations and modifications can be made in the construction of the exemplary embodiment of the invention to be described without departing from the spirit and scope of the invention.

The machine tool 20 exemplifying the invention as illustrated in the drawings, FIG. 1, comprises, as shown, a movable work support table 22 positioned alongside a vertical column 24 supporting a vertically adjustable machining head 26.

As will be presently described, the machining head 26 supports and drives a longitudinally adjustable machining spindle 28 which carries at its outer end, as illustrated in the drawings, a detachable cutting tool 30 used to perform a machining operation on a workpiece 32 illustrated schematically in FIG. 2 and supported on the work table 22, also illustrated schematically in FIG. 2. It will be appreciated that the cutting tool 30 is only one of a wide variety of machining tools that can be attached to the machining spindle 28 in a manner well known to those familiar with machine tools of this type.

The typical cutting tool 30 carried by the projecting end of the rotary machining spindle 28 is used to perform machining operations on workpieces typified by the workpiece 32 in positions which must be located on the workpiece in accordance with specifications that can be most exacting in relation to precision and accuracy.

To obtain the desired positional relationship of the supported cutting tool 30 in relation to the typical workpiece 32, provision is made for adjusting the machining spindle 28 longitudinally in relation to the machining head 26 of which it is a part. After being preadjusted longitudinally to the desired working position, the machining spindle 28 is clamped in a manner to be described for rotation in the longitudinal position to which it is adjusted.

As it is often desirable and frequently advantageous to use machine tools of this character to perform machining operations to most exacting tolerances, great advantages and efficiencies highly valued by those concerned with this art can be gained to the extent that deviations from perfection can be eliminated in the longitudinal positioning of the rotary machining spindle 28 and its supported cutting tool 30 in the performance of a machining operation. Any deviation or deflection of the cutting tool 30 from the exact working position desired can cause a corresponding inaccuracy in the precision with which the machining is performed and is for that reason undesirable.

As previously intimated, the rotary machining spindle 28 is supported for rotary operation in the longitudinal position to which it is adjusted with a degree fo perfection significantly increased in relation to the operation characteristics of prior machine tools of this type with the consequence that the machine has improved capability of performing machining operations with improved precision and efficiency and is inherently well suited to perform machining operations with precise accuracy under automatic control.

Having reference to the construction illustrated, the rotary machining spindle 28 is longitudinally adjusted between a retracted position, shown in solid lines in FIG. 2, and an extended operating position, illustrated in phantom lines in FIG. 2, by means of a controlled fluid actuating cylinder 34 anchored to the housing 36 of the machining head 26 and connected through a collar 38 and bearings 40 with the rotary spindle 28 to displace the latter longitudinally. The spindle 28 is supported for rotary operation in the longitudinal position to which it is adjusted by a centrally bored spindle support sleeve 42 encircling the spindle 28 as illustrated in FIGS. 2, 3 and 4.

As will presently appear, the spindle 28 is clamped and held in the precise longitudinal position to which it is adjusted in a manner such that no significant axial displacement of the preadjusted spindle occurs either as an incident to operation of the machine to clamp the machining spindle in its longitudinally preadjusted position or as a consequence of the axial reaction of the spindle supported cutter during normal operation of the machine.

When the machine tool 20 is in operation, rigid base support structure for the rotary spindle 28 is provided by the housing or frame of the machining head 26, indicated generally by the number 36. The rotary support sleeve 42 for the spindle 28 is journalled in the machining head housing or frame 36 immediately within that portion of the machining head housing 36 from which the spindle projects in the direction of the work support table 22, FIGS. 1 and 3.

The spindle sleeve 42 is rotated in operation by bull gear 44 meshing with a driving gear 46 and is keyed to the spindle 28 so that the sleeve and spindle rotate in unison. In the construction illustrated, two driving keys 48 (only one of which is shown, FIG. 3) slidably engage two longitudinal keyways 50 in the spindle 28.

The spindle sleeve 42 is radially supported with precision in an exact rotary operating position on the support structure 36 by a high precision radial and thrust bearing 52, FIGS. 3 and 4, preferably a tapered roller bearing as shown, which is positioned and correlated with reference to the sleeve 42, and particularly with reference to the end of the sleeve nearest that portion of the spindle which projects outwardly to support the cutting tool 30 in a most precise axial position.

For this purpose, the outer race 54 of the precision tapered roller bearing 52 is accurately fitted into a counterbore or bearing well 56 formed in the support structure 36, as shown in FIGS. 3 and 4, in coaxial relation to the housing bore 58 through which the spindle 28 emerges to support the cutting tool 30.

The inner radial side 60 of the outer bearing race 54 fits against a first annular locating abutment 62 formed on the supporting base structure 36 by the flat annular bottom (also denoted by the number 62) of the counterbore or bearing well 56. As will presently appear, engagement of the annular abutment 62 with the outer bearing race 54 functions to locate the bearing 52 in a precise axial position in relation to the support structure 36.

The inner race 64 of the bearing 52 fits around a cylindrical surface 66 on the sleeve 42 to support the sleeve 42 radially in precise coaxial relation to the bearing 52. An inwardly facing flat annular shoulder or abutment 68 engages the outer end of the inner bearing race 64 to locate, as will presently appear, the sleeve 42 and particularly that portion of the sleeve 42 encircled by the bearing 52 in a precise longitudinal position in relation to the bearing 52 and, in turn, in relation to the support structure 36.

As will be seen in the drawings, the second longitudinal locating abutment or shoulder 68 is located rather near the end of the sleeve 42 from which the tool supporting end of the spindle 28 emerges, sufficient structural material being provided between the locating abutment 68 and the adjacent end of the sleeve 42 to provide a high order of rigidity in the support of the abutment 68 on the sleeve.

In the preferred construction illustrated, the spacing of the sleeve abutment 68 from the adjacent end of the sleeve 42 approximates the axial width of the precision tapered roller bearing 52 and is equal to only a rather minor fraction of the diameter of the sleeve surface 66 encircled by the bearing 52.

The opposite or inner end of the sleeve 42, which extends more deeply into the machining head housing 36, is journalled preferably by a precision tapered roller bearing 70, FIG. 3, that provides a precision radial support to the sleeve 42 and functions, as will be described, to apply residual thrust load to the sleeve 42 which assures maintenance of the axial locating bearing 52, previously described, in optimum engagement with both the coacting locating abutments 60 and 68 on the support structure 36 and sleeve 42, respectively.

In the preferred construction illustrated, the outer race 72 of the tapered roller bearing 70 is encircled and precisely located radially by an encircling cylindrical surface 74 on the support structure 36 within which the outer bearing race 72 is axially movable. The inner race 76 of the bearing 70 fits closely around a cylindrical surface 78 on the inner end of the sleeve 42 to support the latter radially. Also, the inner race 76 fits against an annular locating abutment 80, FIG. 3, facing axially toward the outer cutter supporting end of the spindle 28 and being defined by an annular sleeve extension 82 detachably secured by cap screws 84 to the inner end of the sleeve 42, as will be described.

A controlled degree of axial force sufficient to provide optimum perloading of the precision axial locating bearing 52 is transmitted through the tapered roller bearing 70 to the annular abutement 80 attached to the sleeve 42. Axial preloading of the axial locating bearing 52 is afforded by suitable biasing means such as can be readily provided by those skilled in the art. In the illustrated construction, hydraulic biasing means is provided for this purpose and includes an annular piston 86 slidably mounted within a coacting annular cylinder 88 and acted upon by fluid supplied to the cylinder 88 through a conduit 90, FIG. 3, to engage the axially movable outer race 72 of the bearing 70 to transmit thrust through the bearing 70 to the abutment 80 as mentioned.

The thrust thus applied to the rotary abutment 80 is transmitted forwardly and outwardly through the sleeve 42 back to the sleeve abutment 68 in engagement with the bearing 52 to produce an axial loading of the bearing 52 such that the bearing thus preloaded functions in engagement with the stationary annular abutment 62 on the support structure 36 and the rotary abutment 68 on the sleeve 42 to achieve the desired precision positioning of the forward end of the sleeve 42 encircled by the bearing 52. At the same time, the preloading thrust transmitted through the tapered roller bearing 70 assures optimum functioning of this precision bearing to provide precise radial support to the inner end of the sleeve 42. A sleeve bearing 91 fitted into a counterbore 93 in the inner end of the sleeve 42 closely encircles the spindle 28 to provide accurate radial support to the portion of the spindle encircled by the bearing 70.

The spindle 28, preadjusted longitudinally, is clamped for rotation in the desired working position by hydraulically energized clamping structure carried by the sleeve 42 and engaged with the spindle 28, as will be described, by actuating fluid under such high working pressure that the actuated fluid, as a practical matter, must be pumped to its high working pressure by pump structure rotatable with the spindle sleeve 42 itself.

The hydraulically energized spindle clamping structure carried by the sleeve 42 and the high pressure pumping means rotatable with the sleeve 42 to energize the clamping structure are correlated structurally and functionally in relation to each other and in relation to the sleeve support structure which locates the sleeve 42 axially in such manner that operation of the high pressure pumping means to apply the hydraulic clamp does not disturb precise longitudinal positioning of the spindle and the exact longitudinal positioning of the spindle is effectively held against longitudinal displacement by force reactions on the spindle supported cutting tool 30 when the machine is in operation.

Having reference to the preferred construction illustrated, the spindle 28 after being adjusted longitudinally to a precise longitudinal position for machining is clamped securely to the sleeve 42 by a hydraulically energized clamp or clutch constituted, as shown, by a clamping bushing 94 encircling the spindle 28, as illustrated in FIGS. 2, 3 and 4, and carried within the sleeve 42 near the sleeve end which defines the locating abutment 68 that engages the precision tapered roller bearing 52 to determine the precise axial position of the sleeve 42.

The hydraulically actuated clamping bushing 94 is placed axially near the outer end of the sleeve 42 to produce a strong releasable connection between the outer end portion of the sleeve 42 and the longitudinally adjacent portion of the spindle 28 so as to minimize effectively the longitudinal extent of the sleeve and the spindle 28 extending axially outwardly from the releasable connection made between the sleeve and the spindle.

By virtue of the described position of the clamp bushing 94 in relation to the outer end of the sleeve 42 from which the spindle 28 projects, the axial extent of the sleeve structure extending between the longitudinal locating abutment 68 on the sleeve and the hydraulically energized clamp bushing 94 which releasably connects the encircling portion of the sleeve 42 with the adjacent portion of the spindle 28 is minimized. Also minimized is the length of the longitudinal segment of spindle 28 extending between the cutter 30 supported on the outer end of the spindle and the clamp bushing 94 for any longitudinal position of adjustment of the spindle. Thus, the longitudinal extent of the sleeve structure exposed to axial strain as a consequence of transmission of axial force reactions from the cutter 30 through the sleeve 42 to the abutment 68 from the clamped connection between the sleeve and the spindle is so small that it is, as a practical matter, inconsequential. There is, moreover, a corresponding minimization of the longitudinal lengths of the sleeve structure and the spindle structure that function in determining the exact axial location of the supported cutter 30 and are subject to thermal expansion and contraction incident to changes in the operating temperature of the machine.

Structurally, the hydraulically energized clamp bushing 94 illustrated has a cylindrical form overall and defines a cylindrical inner surface 96, FIG. 4, closely encircling the spindle 28 which extends as shown through a central bore 98 in the sleeve 42.

The clamping bushing 94 is press fitted into a counterbore 100 in the sleeve bore 98, as illustrated in FIG. 4, and sealed at opposite ends to the sleeve 42. A plurality of circumferentially spaced, axially extending grooves 102 formed in the wall of the counterbore 100 in confronting relation to the exterior surface 104 of the clamping bushing 94, FIG. 5, coact with the clamping bushing 94 to define a corresponding number of plenum cavities 106 mutually interconnected by an annular connecting groove or channel 108 of annular shape formed in the counterbore 100 medially between the ends of the cavities 106.

Clamp energizing liquid under high pressure of the order of 5,000 lbs. per square inch supplied to the annular distribution channel 108, as will be described, fills the plenum cavities 106 to exert pressure forces on the clamping bushing 94 sufficiently powerful to squeeze the bushing 94 against the encircled spindle 28 to produce a frictional connection between the clamping bushing and the spindle that effectively precludes longitudinal displacement of the spindle in relation to the encircling portion of the sleeve, which, as pointed out, is closely adjacent longitudinally to the longitudinal locating abutment 68 on the sleeve 42, to the precision locating bearing 52 engaged by the abutment 68, and to the annular locating abutment 62 for the bearing 52.

Energizing fluid under the very high operating pressure required is supplied to the distributing channel 108 and plenum cavities 106 by a plurality of high pressure plunger pumps 110, in this instance four, carried by the sleeve 42 and actuated, in turn, by operating fluid under a much lower pressure in such manner that fluid energized actuation of the pumps 110 to clamp the spindle 28 by means of the clamping bushing 94 adjacent the longitudinal locating bearing 52 is effected without disturbing the longitudinal position to which the spindle 28 is preadjusted.

The high pressure clamp energizing pumps 110 comprise respectievly four high pressure pump cylinders of small caliber 112 formed in the inner end of the sleeve 42 in circumferentially spaced relation to each other as shown in FIGS. 3 and 6. The forward end or bottom of each high pressure pump cylinder 112 is connected through a small longitudinal bore 114 and a short radial bore 116 in the sleeve 42 with the high pressure fluid distributing channel 108, as shown in FIG. 3, the annular distributing channel 108 thus forming a pressure equalizing passage between all of the high pressure pump cylinders 112.

The high pressure pump cylinders 112 respectively receive high pressure pumping plungers or pistons 118 of correspondingly small caliber, also as shown in FIGS. 3 and 6.

The four high pressure plunger or pistons 118 are forced forwardly in unison to pressurize the clamp engaging cavities 106 by a low pressure actuating piston 120, FIGS. 3 and 7, carried rotatably within the cylindrical extension 82 of the rotary sleeve 42 and forced forwardly, as will presently appear, by operating fluid under a much lower pressure fed to the rotary sleeve extension 82.

For convenience in manufacture, the sleeve extension 82 is fashioned in three parts comprising an inner, axially elongated sleeve element 122 secured by the cap screws 84 to the inner end of the sleeve 42 and extending inwardly, as shown in FIG. 3, in encircling relation to the spindle 28 to define a cylindrical outer surface 124. A second sleeve extension component 126 of annular configuration is fixed to the component 122 in encircling relation to the cylindrical surface 124, as shown in FIG. 3, and has a cylindrical inner surface 128 disposed in radially spaced relation to the surface 124 to define therewith an annular low pressure cylinder 130 slidably receiving the previously mentioned low pressure actuating piston 120 having an annular form as illustrated in FIGS. 3 and 7.

The forward end of the outer sleeve extension component 126 cooperates with the forward end of the inner sleeve extension element 122 and the cap screws 84 to make the forward or bottom end of the cylinder 130 fluid tight. The opposite or inner end of the low pressure cylinder 130 is closed to be fluid tight by a third annular element 132 secured by screws 134 to the outer sleeve extension 126, FIG. 3, and sealably encircling the cylindrical surface 124 on the inner sleeve extension element 122. The sleeve elements 122, 126 and 132 together constitute a first fluid power element of a low pressure fluid motor, denoted generally by the number 133, having a second fluid power element formed by the annular piston 120.

As will presently appear, control fluid under low pressure supplied through an axial bore 136 to the inner or "top" end of the cylinder 130 moves the low pressure annular piston 120 forwardly against the high pressure pump plungers 118 to effect clamping of the spindle 28. The release of operating fluid pressure from the inner end of the cylinder 130 accompanied by the direction of low pressure operating fluid to the forward end of the cylinder 130 through an axial passage 138, FIG. 3, in the inner sleeve extension element 122 effects a rearward or inward retraction of the low pressure piston 120 with the consequence that forward force on the high pressure pistons 118 is relieved and the hydraulic clamping of the spindle 28 is released.

Energizing fluid under low pressure is supplied to the low pressure cylinder supply passages 136, 138 in the rotating sleeve extension element 122 through an annular fluid supply collar or collector ring 140 constructed and coacting with the inner portion of the cylindrical surface 124 on the element 122 in such fashion that the rotating spindle assembly can turn at high operating speeds without adverse effects on the fluid supply structure and a virtually unlimited service life of the fluid supply means is obtained by virtue of the fact that sliding contact between structure which rotates and structure that does not rotate is eliminated, the fluid supply collar or collector ring 140 being restrained against rotation as will presently appear.

As shown in FIGS. 3 and 8, the fluid supply collar 140, which encircles the inner end of the cylindrical surface 124 on the rotating sleeve extension element 122, has an annular or ring-like form overall modified by inclusion on the structure of the collar of an integral anchoring ear 142 projecting radially outward. An axial bore 144 in the ear 142 loosely receives a similarly oriented anchoring stud 146 threaded as shown into a nonrotating anchor bracket 148.

By virtue of the loose fit or lost motion provided in all directions between the anchoring ear 142 and the anchoring stud 146 received within the ear opening 144, the fluid supply collar 140 is held against rotation while at the same time being free to move in all directions in relation to the nonrotating stud 146 to seek and maintain under the forces of operating fluid pressure an optimum operating position in coaxial relation to the rotating cylindrical surface 124.

The inner periphery of the fluid supply collar 140 defines a cylindrical face, denoted generally by the number 150, FIGS. 9 and 11, precisely finished and accurately dimensioned in diameter to provide between the rotating cylindrical surface 124 and the inner face 150 a running clearance 152, highly exaggerated in FIG. 11 for purposes of illustration. This clearance most advantageously should be of the order of twelve to eighteen ten thousandths (.0012 to .0018) of an inch.

As shown in solid lines in FIG. 11 and in phantom lines in FIGS. 8 and 10, two individually continuous circular operating fluid supply and exhaust grooves 154, 156 are formed in the inner periphery of the collar 140 and spaced axially apart by an intervening annular land 158 defining an annular portion of the cylindrical face 150 which has the very close running fit with the cylindrical surface 124 previously described. The collar 140 is axially positioned in relation to the sleeve extension element 122 so that the grooves 154, 156 register axially and communicate respectively with radial ports 160, FIGS. 3 and 11, and 162 communicating respectively with the axial bores 138, 136 leading to opposite ends of the low pressure cylinder 130.

The two low pressure operating fluid supply grooves 154, 156 communicating with opposite ends of the low pressure cylinder 130 are connected through radial bores 164, 166 with low pressure fluid conduits 168, 170 leading, as illustrated diagrammatically in FIG. 3, to a reversing valve 172 connected to exhaust 174 and to a low pressure fluid supply source 176 which supplies fluid under an operating pressure of approximately 250 lbs. to the two supply grooves 154, 156 selectively as determined by operation of the valve 172 which functions upon directing fluid under pressure to either of the grooves 154, 156 to connect the other groove to exhaust.

During operation of the machine tool, the fluid supply collar or collector ring 140 is continuously held out of contact with the rotating cylindrical surface 124 and the inner cylindrical face 150 of the collar 140 is continuously maintained in exactly centered, coaxial relation to the cylindrical surface 124 by eight hydrostatic bearings 180 provided on the collar 140 in conjunction with the encircled cylindrical surface 124, four hydrostatic bearings 180 being located at each side of the two fluid supply grooves 154, 156 and evenly spaced circumferentially around the cylindrical surface 124.

As shown in FIG. 10, the four hydrostatic bearings 180 located at one side of the juxtaposed fluid supply grooves 154, 156 are formed respectively by the four quadrants of a discontinuous annular groove indicated generally by the number 182 formed in the inner periphery of the collar 140 and spaced axially, FIG. 11, from the fluid supply groove 156 by an intervening annular land 184. The groove 182 is interrupted by four circumferentially spaced discontinuities 186 where undisturbed portions (also denoted by the number 186) of the inner face 150 of the collar 140 closely confront the rotary cylindrical surface 124 to divide the groove 182 into four arcuate cavities 190 evenly spaced circumferentially around the surface 124 and corresponding to the respective hydrostatic bearings 180.

In a similar manner, the four hydrostatic bearings 180 located on the opposite side of the fluid supply grooves 154, 156 are formed by a discontinuous groove 200 formed in the inner periphery of the collar 140 and spaced from the fluid supply groove 154 by an intervening land 202, FIG. 11. The discontinuous groove 200 is similar in all material respects to the previously described discontinuous groove 182 on the other side of the grooves 154, 156.

Each hydrostatic bearing 180 is supplied with fluid under pressure which acts directly on the rotating cylindrical surface 124 and reacts radially outward on the supply collar structure defining the bearing to urge the adjacent portion of the collar 140 away from the rotating surface 124 for the purpose of preventing rubbing contact between the collar and the rotating surface 124. Since the four hydrostatic bearings 180 located on the respective sides of the supply grooves 154, 156, as described, are circumferentially spaced around the cylindrical surface 124, their radial reactions on the supply collar or collector ring 140 tend to balance against each other.

However, to assure holding of the collar 140 out of contact with the rotating encircled surface 124, fluid is supplied to the respective hydrostatic bearings 180 under pressures for the respective bearings that are dynamically varied automatically as an incident to any incipient radial misalignment of the floating collar 140 in relation to the encircled cylindrical surface so that the hydrostatic bearings act cumulatively to exert a net force on the collar sufficient to hold the collar out of rubbing contact with the cylindrical surface 124.

Because of the running clearance provided between the inner cylindrical face or periphery 150 of the collar 140 and the encircled cylindrical surface 124, as described, there is a dynamic spillage of pressurized fluid from the respective hydrostatic bearings 180 along the cylindrical surface 124. This operating characteristic is utilized to advantage in providing an automatic self-correction of any incipient radial misalignment of the floating collar 140 with respect to the cylindrical surface 124. For this purpose, operating fluid under pressure is supplied to the respective hydrostatic bearings 180 through pressure reducing passages or orifices which effect a drop in the fluid pressure admitted to each individual hydrostatic bearing that is generally proportional to the rate of escape of fluid from the respective bearing along the cylindrical surface 124.

For this purpose, the four hydrostatic bearings 180 located on the righthand side of the fluid supply grooves 154, 156, with respect to FIGS. 3, 8 and 11, are supplied with fluid under pressure by four fluid supply conduits 194, FIG. 10, connected through four radial bores 196 with the respective cavities 190 corresponding to the four hydrostatic bearings mentioned. The four fluid supply conduits 194 are continuously charged with fluid under a pressure which may be of the order of 500 lbs. per square inch, for example, from a stationary source of fluid under pressure shown diagrammatically in FIG. 3 and denoted by the number 198.

Before being admitted to the respective hydrostatic bearing cavities 190, the fluid supplied by the conduits 194 passes through pressure reducing orifices or strictures 203, FIGS. 9, 10 and 11. As shown in the drawings, the pressure reducing orifices or strictures 203 are formed in the collar 140 to connect the respective cavities 190 with the bores 196 which receive the pressure conduits 194.

In like manner, fluid for forming the hydrostatic bearings 180 in the discontinuous groove 200, on the opposite side of the fluid grooves 154, 156, is supplied through four radial bores 204 formed in the collar 140, FIGS. 3 and 11, and connected respectively with four supply lines 206 leading from the source 198 of fluid under pressure.

Pressure reducing orifices or strictures 207, similar to the previously described orifices 203, connect the respective fluid supply bores 204 to the corresponding four hydrostatic bearings 180.

The four pressure reducing orifices or strictures 203 and the four pressure reducing orifices or strictures 207 are dimensioned to effect for the normal rate of fluid flow through the respective orifices incident to the escape of fluid from the corresponding hydrostatic bearings 180, a reduction in the pressure of the fluid passing through the respective orifices from a relatively high input pressure, which may be of the order of 500 p.s.i. as supplied from the source 198 as mentioned, to a reduced output pressure, which may, for example, be of the order of 250 p.s.i. Hence, under normal conditions with reference to the example mentioned, the fluid pressure in all the hydrostatic bearings 180 would be of the order of 250 p.s.i.

As a consequence of any incipient radial misalignment of the collar 140 and the encircled cylindrical surface 124, produced by the physical weight of the collar 140 or otherwise and tending to reduce the running clearance between the collar 140 and the cylindrical surface 124 adjacent any one of the hydrostatic bearings 180, the normal rate at which fluid escapes along the surface 124 from that particular bearing is decreased. The corresponding decrease in the rate of flow through the orifice 203 or 207 feeding that particular hydrostatic bearing results in a loss in the pressure drop through the feeding orifice with a corresponding buildup in the fluid pressure within that bearing. The increased pressure in the bearing produces an increased radial reaction of the bearing against the collar 140 to oppose the disturbing force tending to cause incipient misalignment of the collar with respect to the encircled cylindrical surface.

In conjunction with the increase in fluid pressure automatically applied in the hydrostatic bearing 180 located adjacent the zone where there is an incipient minimization of radial clearance between the collar 140 and the surface 124, there is produced at the same time an automatic decrease in the pressure of fluid in the hydrostatic bearing located on the diametrically opposite side of the collar 140. The reduction in pressure in the diametrically opposed hydrostatic bearing results from an increase in the normal running clearance between the collar 140 and surface 124 at the opposite side of the collar with an increased rate of spillage from the opposite hydrostatic bearing with the consequent drop in the pressure of fluid entering the opposite bearing due to the increased rate of fluid through the orifice 203 or 207 supplying that bearing.

The reduction in the outward radial force on the collar 140 of the hydrostatic bearing or bearings at the side of the collar where there is an incipient increase in running clearance operates in conjunction with the increased radial force applied to the collar by the hydrostatic bearing or bearings at the first side of the collar, where there is an incipient decrease in running clearance, to further assure application of a cumulative radial force to the collar 140 to continuously hold it dynamically in effective coaxial alignment with the rotating surface 124 and out of rubbing contact with the surface 124.

Hence, during operation of the machine tool, there is no frictional or abrasive contact between the structure of the fluid supply collar 140 and the rotating surface 124 that would otherwise cause erosion such as would enlarge the very small running clearance 152 between the rotating cylindrical surface 124 and the collar 140, which by virtue of its small size, restricts to tolerable limits spillage of fluid across the inner face surface 150 of the collar from the various inner cavities and grooves in the collar containing fluid under pressure.

When the machine is in operation and the spindle 28 has been adjusted longitudinally to place the supported cutting tool 30 in the exact working position desired, a hydraulic control, represented in this instance by the valve 172 shown diagrammatically in FIG. 3, is operated to supply energizing fluid under a relatively low pressure which may be of the order of 250 lbs. per square inch through the fluid supply groove 156 in the collar 140 to the inner or "top" end of the low pressure cylinder 130 where such low pressure fluid acts on the annular low pressure piston 120 to apply a forward force to the several high pressure plungers or pistons 118. By virtue of having a cumulative face area which is only a very small fraction of the effective face area of the low pressure piston 120, the high pressure plungers 118 acting within the several high pressure cylinders 112 produce in the cylinders 112 and apply to the clamping cavities 106 a very high fluid pressure which may be of the order of 5,000 lbs. per square inch to connect the spindle 28 with the sleeve 42 in the manner described.

It should be observed at this point that the four longitudinal bores 114, FIG. 6, which connect the high pressure cylinders 112 with the radial bores 116 leading to the high pressure annular channel 108 have forward ends terminating adjacent the radial bores 116, only one of which appears in FIG. 3. The significance of this will appear presently. A single bore 210 closed by a removable filler cap 212 extends rearwardly through the spindle sleeve 42 from its forward end to one of the radial bores 116, in offset relation to an adjacent one of the bores 114 as shown in FIG. 3, to provide a means for introducing fluid into the high pressure fluid space within the rotating sleeve assembly, denoted generally by the number 214.

It should be appreciated at this point that energization of the low pressure fluid cylinder 130 to apply the hydraulic clamp 94 with attendant operation of the high pressure pumps 110 to generate the requisite high operating fluid pressure for the hydraulic clamp does not disturb the precise longitudinal preadjustment of the spindle 28. This follows from the fact that the structure which locates the spindle 28 longitudinally is maintained effectively free of axial stress incident to operation of the rotary assembly to apply the clamp. As previously pointed out, the longitudinal position of the spindle 28 is accurately determined by structure at the forward end of the spindle sleeve 42 situated proximate to the precision locating bearing 52.

Axial stresses are developed in the rotating assembly 214 as an incident to operation of the assembly to apply the spindle clamp 94, but these stresses are effectively confined to the inner end of the rotating assembly so that the structure which determines the axial position of the spindle 28 is effectively free of axial stress induced as an incident to operation of the hydraulic clamp.

Having reference to FIG. 3, it will be appreciated that the primary operating fluid under a relatively low pressure introduced to the inner or top end of the cylinder 130 to actuate the low pressure piston 120 reacts inwardly on the low pressure piston head member 132 which in turn transmits the axial force through the sleeve extension element 126 and cap screws 84 to the inner end of the sleeve 42. The axial force thus applied to the inner end of the rotary sleeve 42 is sharply reduced at the bottoms of the high pressure cylinders 112 by the reaction of high pressure fluid on the bottoms of these cylinders.

The reduced axial force transmitted forwardly from the high pressure cylinders 112 is effectively offset in all material respects at the forward ends of the passages 114 which terminate at the radial bores 116 positioned medially with respect to the hydraulic clamp 94. As a consequence, the forward portion of the sleeve 42 extending axially between the fluid distributing channel 108 and the locating abutment 68 on the sleeve 42 and being virtually clamped to the spindle 28 is effectively maintained free of axial stress so that the longitudinal position of the spindle 28 is not disturbed by operation of the structure to apply the clamp as described.

It will be appreciated that when the machine tool is in operation with the spindle 28 securely clamped in its preadjusted position, the working parts of the rotating sleeve assembly 214, which function to hold the spindle in its clamped condition, have a static positional relationship to each other, the rotating sleeve assembly being journalled by the two bearings 52, 70 and supplied continuously with operating fluid under low pressure through the stationary collector ring or collar 140 which is hydrostatically held free of mechanical contact with the rotating assembly as described.

As a safety measure, provision is made for preventing operation of the machine tool in the event of an abnormal depletion of the fluid supply within the rotating sleeve assembly 214 that is pressurized by the high pressure pumps 110 to clamp the spindle in the manner described.

For this purpose, one or more bleed ports 215 are provided in the outer sidewall of the low pressure cylinder 130 and axially located as shown in FIG. 3 to be normally covered by the low pressure piston 120 even when the latter is moved forwardly to effect clamping of the spindle 28. In the event the supply of high pressure fluid in the rotating sleeve assembly 214 is abnormally depleted, the high pressure pumps 110 allow the low pressure piston 120 to travel forwardly sufficiently to uncover the exhaust ports 215 with the consequence that the low pressure actuating fluid supplied to the top end of the low pressure actuating cylinder 130 cannot build up to its normal operating level.

The consequent condition of an abnormally low operating pressure on the top end of the low pressure cylinder 130 is sensed, as shown for purposes of illustration in FIG. 3, by a pressure responsive switch 217 connected to the low pressure fluid supply line 170 leading to the top end of the low pressure cylinder 130. The switch 217 operates through an electrical circuit represented in FIG. 3 by power leads 219 to block operation of the machine tool until the quantity of fluid in the high pressure fluid system has been replenished through the supply bore 210 accessible upon removal of the filler plug 212 as described.

The invention is claimed as follows:

1. A machine tool comprising, in combination, a work support table, a machining head positioned alongside said work support table in movable relation thereto and including rigid support means, a rotary spindle support sleeve having an outer end, a first precision tapered roller bearing rigidly supported on said support means and encircling said spindle support sleeve adjacent said outer end thereof to support the spindle sleeve both radially and axially, first rigid abutment means on said support means rigidly engaging said first precision tapered roller bearing rigidly to support the latter in a precise axial position, second rigid abutment means on said spindle sleeve rigidly engaging said first precision tapered roller bearing to locate the spindle sleeve in a precise axial position with reference to said first bearing, a second precision tapered roller bearing rigidly supported by said support means and encircling said spindle sleeve in axially spaced inward relation to said first bearing to support the sleeve radially, third abutment means on said spindle sleeve engaging said second bearing to transmit to the spindle sleeve thrust from said second bearing, biasing means coacting with said second bearing to transmit therethrough and through said third abutment means thrust to said spindle sleeve for urging the latter axially to a longitudinal position precisely determined by the coaction of said first and second abutment means with said first bearing, a machining spindle slidably disposed in said spindle sleeve for rotation therewith and for longitudinal adjustment therein to project to a varying degree beyond said outer end of the spindle sleeve, said spindle having working element support means on the projecting end thereof, a spindle clamping bushing carried by said spindle sleeve in closely encircling relation to said spindle and coacting with means on said sleeve to define plenum space for high pressure fluid positioned on the radially outward side of the clamping bushing, said spindle sleeve defining a circumferentially spaced series of axially extending high pressure cylinders axially spaced from both said bearings and from said spindle clamping bushing in a direction away from said outer end of the sleeve, said spindle sleeve defining high pressure fluid passages connecting said high pressure cylinders to said plenum space, a plurality of high pressure pistons slidably disposed in said respective high pressure cylinders, low pressure cylinder means defining an annular cylinder for low pressure fluid disposed in coaxial relation to the spindle sleeve and in encircling relation to said spindle, a low pressure annular piston slidably disposed in said low pressure cylinder and reacting on said high pressure pistons to urge the latter axially in a spindle clamping direction for expressing high pressure fluid from said high pressure cylinders into said plenum space for forcing said clamping bushing firmly against said spindle to hold the latter against axial displacement in said spindle sleeve, said low pressure cylinder means being interconnected with the end of said spindle sleeve opposite from said outer end thereof for rotation with the spindle sleeve and to transmit to the spindle sleeve the reaction of low pressure fluid on said low pressure cylinder, and low pressure actuating fluid supply means communicating with said low pressure cylinder to supply low pressure operating fluid to the latter.

2. A machine tool comprising, in combination, a work support table, a machining head positioned in movable relation to said table and including support means, a rotary spindle support sleeve having an outer end, precision bearing means encircling said spindle support sleeve adjacent said outer end thereof, first locating means on said support means engaging said precision bearing means to hold the latter precisely in an exact axially predetermined position in relation to said support means, second locating means on said outer end of said spindle support sleeve engaging said precision bearing means to hold the outer end of the sleeve precisely in an exact axially predetermined position in relation to said precision bearing means, a machining spindle slidably disposed in said spindle sleeve for rotation therewith and for longitudinal adjustment therein to project a table end of the spindle beyond said outer end of the spindle sleeve to a variable degree, said spindle having working element support means on the table end thereof, a spindle clamping bushing carried by said spindle sleeve in closely encircling relation to said spindle and located longitudinally in axially proximate relation to said second locating means on the spindle sleeve, said clamping bushing coacting with means on said sleeve to define plenum space for high pressure fluid positioned on the radially outward side of the clamping bushing, said spindle sleeve having high pressure pump means rotatable therewith and including means defining a high pressure pump cylinder spaced from said clamping bushing and from said second locating means in an axial direction with reference to said spindle sleeve, said spindle sleeve defining a high pressure fluid passage connecting said high pressure pump cylinder to said plenum space, a high pressure piston slidably disposed in said high pressure cylinder, low pressure cylinder means defining an annular cylinder for low pressure fluid disposed in coaxial relation to the spindle sleeve and in encircling relation to said spindle, a low pressure piston slidably disposed in said low pressure cylinder and reacting on said high pressure piston to urge the latter in a spindle clamping direction for expressing high pressure fluid from said high pressure cylinder into said plenum space for forcing said clamping bushing firmly against said spindle to hold the latter against axial displacement in said spindle sleeve; said low pressure cylinder means being interconnected with said high pressure pump defining means for rotation with said spindle sleeve and to transmit to said high pressure cylinder the axial force reaction of fluid pressure on said low pressure cylinder independently of said support means, said precision bearing means, said first locating means, and said second locating means; and low pressure actuating fluid supply means communicating with said low pressure cylinder to supply low pressure operating fluid to the latter.

3. A machine tool comprising, in combination, a machining head including support means, a rotary spindle support sleeve having an outer end, precision bearing means supported on said support means and encircling said spindle support sleeve to support the latter for rotation, first locating means on said support means engaging said precision bearing means to locate the latter in an exact axial position, second locating means on said spindle sleeve engaging said bearing means to locate the spindle sleeve in an exact axial position with reference to said bearing means so that the bearing means in conjunction with said first and second locating means locates the spindle sleeve in an exact axial position in relation to said support means, a machining spindle slidably disposed in said spindle sleeve for rotation therewith and for longitudinal adjustment therein to project to a varying degree beyond said outer end of the spindle sleeve, said spindle having working element support means on the projecting end thereof, a high pressure hydraulic clamp carried by said spindle sleeve to clamp an adjacent portion of said spindle, said spindle sleeve defining a high pressure cylinder axially spaced from said hydraulic clamp, said spindle sleeve defining a high pressure fluid passage connecting said high pressure cylinder to said hydraulic clamp, a high pressure piston slidably disposed in said high pressure cylinder, means defining a cylinder for low pressure operating fluid, a low pressure piston slidably disposed in said low pressure cylinder and reacting on said high pressure piston to urge the latter in a spindle clamping direction for expressing high pressure fluid from said high pressure cylinder into said hydraulic clamp to clamp said spindle against axial displacement in said spindle sleeve; said low pressure cylinder being interconnected with the end of said spindle sleeve on the high pressure cylinder side of said second locating means, independently of said precision bearing means and said first and second locating means, to transmit to the spindle sleeve the reaction of low pressure fluid on said low pressure cylinder; and low pressure actuating fluid supply means communicating with said low pressure cylinder to supply low pressure operating fluid thereto.

4. A machine tool comprising, in combination, a work support table, a machining head positioned alongside said work support table in movable relation thereto and including support means, a rotary spindle support sleeve having an outer end, a first precision tapered roller bearing supported on said support means and encircling an outer end segment of said spindle support sleeve adjacent said outer end thereof to support the spindle sleeve radially in an exact operating position, first rigid abutment means on said support means engaging said first precision tapered roller bearing rigidly to support the latter axially in a precise position, second abutment means rigidly positioned on said spindle sleeve adjacent said outer end segment thereof and engaging said first precision tapered roller bearing to locate said outer end segment of the spindle sleeve in a precise axial position with reference to said first bearing, a second precision tapered roller bearing supported by said support means and encircling said spindle sleeve in axially spaced inward relation to said first bearing to support the sleeve radially, third abutment means on said spindle sleeve engaging said second bearing to transmit to the spindle sleeve thrust from said second bearing, biasing means coacting with said second bearing to transmit therethrough and through said third abutment means thrust to said spindle sleeve for urging the latter axially to an exact longitudinal position precisely determined by the coaction of said first and second abutment means with said first bearing, a machining spindle slidably disposed in said spindle sleeve for rotation therewith and for longitudinal adjustment therein to project to a varying degree beyond said outer end of the spindle sleeve, said spindle having working element support means on the projecting end thereof, a high pressure hydraulic clamp carried by said spindle sleeve and located longitudinally in axially proximate relation to said outer end segment of the spindle sleeve releasable to form an axially immovable connection between adjacent portions of said spindle and said spindle sleeve, said spindle sleeve defining a circumferentially spaced series of axially extending high pressure cylinders axially spaced from said high pressure hydraulic clamp in a direction away from said outer end of the sleeve, said spindle sleeve defining high pressure fluid passage space connecting said high pressure cylinders to said hydraulic clamp, a plurality of high pressure pistons slidably disposed in said respective high pressure cylinders, first and second fluid power elements encircling said spindle and mutually overlapping each other in axially slidable relation to each other to define an expandable annular cylinder space for low pressure operating fluid encircling said spindle, low pressure actuating fluid supply means communicating with said annular cylinder space to supply low pressure operating fluid thereto to react forcibly in opposite axial directions on said first and second fluid power elements, one of said fluid power elements being interconnected with the end of said spindle sleeve opposite from said outer end thereof for rotation with the spindle sleeve and to transmit to the spindle sleeve the axial reaction of low pressure operating fluid on said one fluid power element, and the other of said fluid power elements reacting on said high pressure pistons to transmit to the latter the axial reaction of low pressure operating fluid on said other fluid power element to urge said high pressure pistons in a spindle clamping direction to apply said hydraulic clamp.

5. A machine tool comprising, in combination a machining head including support means, a rotary spindle support sleeve, precision bearing means supported on said support means and encircling said spindle support sleeve, first locating means on said support means engaging said precision bearing means to locate the latter in an exact axial position, second locating means on said spindle sleeve engaging said bearing means to locate the spindle sleeve in an exact axial position with reference to said bearing means so that the bearing means in conjunction with said first and second locating means locates the spindle sleeve in an exact axial position in relation to said support means, a machining spindle slidably disposed in said spindle sleeve for rotation therewith and for longitudinal adjustment therein to extend to a varying degree beyond the spindle sleeve, said spindle having working element support means thereon, a high pressure hydraulic clamp carried with said spindle sleeve to clamp an adjacent portion of said spindle, said spindle sleeve having thereon a high pressure cylinder rotatable therewith and axially spaced from said hydraulic clamp and from said second locating means, said spindle sleeve defining a high pressure fluid passage connecting said high pressure cylinder to said hydraulic clamp, a high pressure piston slidably disposed in said high presure cylinder, first and second fluid power elements encircling said spindle and mutually overlapping each other in axially slidably relation to each other to define an expandable annular cylinder space for low pressure actuating fluid encircling said spindle, low pressure actuating fluid supply means communicating with said annular cylinder space to supply low pressure actuating fluid thereto to react forcibly in opposite directions on said respective fluid power elements, one of said fluid power elements being interconnected with said spindle sleeve on the high pressure cylinder side of said second locating means and in axially spaced relation to said second locating means for rotation with the spindle sleeve and to transmit to the spindle sleeve the reaction of low pressure actuating fluid on said one fluid power element, and the other of said fluid power elements reacting on said high pressure piston to transmit to the latter the reaction of low pressure actuating fluid on said other fluid power element to urge the high pressure piston in a spindle clamping direction for expressing high pressure fluid from said high pressure cylinder into said hydraulic clamp to clamp said spindle against axial displacement in said spindle sleeve.

6. A machine tool comprising, in combination, a machining head including support means, a rotary spindle support sleeve, precision bearing means supported on said support means and encircling said spindle support sleeve, first locating means on said support means engaging said precision bearing means to locate the latter in an exact axial position, second locating means on said spindle sleeve engaging said bearing means to locate the spindle sleeve in an exact axial position with reference to said bearing means so that the bearing means in conjunction with said first and second locating means locates the spindle sleeve in an exact axial position in relation to said support means, a machining spindle slidably disposed in said spindle sleeve for rotation therewith and for longitudinal adjustment therein to extend to a varying degree beyond the spindle sleeve, said spindle having working element support means thereon, a high pressure hydraulic clamp carried with said spindle sleeve releasably to clamp the sleeve and the spindle in longitudinally immovable relation to each other, said spindle sleeve having thereon a high pressure pump rotatable therewith, said high pressure pump being connected to said hydraulic clamp, first and second fluid power elements encircling said spindle and mutually overlapping each other in axially sli/lable relation to each other to define an expandable annular cylinder space for low pressure actuating fluid encircling said spindle, low pressure actuating fluid supply means communicating with said annular cylinder space to supply low pressure actuating fluid thereto to react forcibly in opposite directions on said respective fluid power elements; one of said fluid power elements being interconnected with said spindle sleeve, independently of said precision bearing means and said first and second locating means, to transmit to the spindle sleeve the reaction of low pressure actuating fluid on said one fluid power element; and the other of said fluid power elements reacting on said high pressure pump, independently of said precision bearing means and said first and second locating means, to transmit to the latter the reaction of low pressure actuating fluid on said other fluid power element to actuate said high pressure pump to force high pressure fluid into said hydraulic clamp to clamp said spindle against axial displacement in said spindle sleeve.

7. A machine tool comprising, in combination, a machining head including support means, a rotary spindle support sleeve, precision bearing means encircling said spindle support sleeve to support the latter for rotation, first locating means on said support means engaging said precision bearing means to locate the latter precisely in an exact axially predetermined position in relation to said support means, second locating means on said spindle support sleeve engaging said precision bearing means to hold the sleeve precisely in an exact axially predetermined position in relation to said precision bearing means, a machining spindle slidably disposed in said spindle sleeve for rotation therewith and for longitudinal adjustment therein, means for moving said spindle longitudinally through said sleeve to various positions of longitudinal adjustment, said spindle having working element support means thereon, a high pressure hydraulic clamp carried with said spindle sleeve in coacting relation to said spindle releasably to clamp said spindle and said sleeve in longitudinally immovable relation to each other, high pressure pump means rotatable with said spindle and including means defining a high pressure pump cylinder connected to said hydraulic clamp, a high pressure piston slidably disposed in said high pressure cylinder, low pressure cylinder means defining an annular cylinder for low pressure fluid disposed in coaxial relation to the spindle sleeve and in encircling relation to said spindle, a low pressure piston slidably disposed in said low pressure cylinder and reacting on said high pressure piston to urge the latter in a spindle clamping direction for expressing said high pressure fluid from said high pressure cylinder into said hydraulic clamp for releasably clamping said spindle against axial displacement relative to said spindle sleeve; said low pressure cylinder means being interconnected with said high pressure pump means for rotation with said spindle sleeve and to transmit to said high pressure cylinder the axial force reaction of fluid pressure on said low pressure cylinder independently of said support means, said precision bearing means, said first locating means, and said second locating means; and low pressure actuating fluid supply means communicating with said low pressure cylinder to supply low pressure operating fluid to the latter.

8. A machine tool comprising, in combination, a machining head including support means, a rotary spindle support sleeve, precision bearing means supported on said support means and encircling said spindle support sleeve, first locating means on said support means engaging said precision bearing means to locate the latter in an exact axial position, second locating means on said spindle sleeve engaging said bearing means to locate the spindle sleeve in an exact axial position with reference to said bearing means so that the bearing means in conjunction with said first and second locating means locates the spindle sleeve in an exact axial position in relation to said support means, a machining spindle slidably disposed in said spindle sleeve for rotation therewith and for longitudinal adjustment therein, adjusting means coacting with said spindle to move the latter axially to various positions of longitudinal adjustment, said spindle having working element support means thereon, a high pressure hydraulic clamp carried with said spindle sleeve releasably to clamp the sleeve and the spindle in longitudinally immovable relation to each other, said spindle sleeve having thereon a high pressure pump rotatable therewith and connected to said hydraulic clamp to apply the latter, first and second fluid power elements rotatable with said spindle sleeve and mutually overlapping each other in slidable relation to each other to define an expandable cylinder space for low pressure actuating fluid, low pressure actuating fluid supply means communicating with said annular cylinder space to supply low pressure actuating fluid thereto to react forcibly in opposite directions on said respective fluid power elements; one of said fluid power elements being interconnected with said spindle sleeve, independently of said precision bearing means and said first and second locating means, to transmit to the spindle sleeve the reaction of low pressure actuating fluid on said one fluid power element; and the other of said fluid power elements reacting on said high pressure pump, independently of said precision bearing means and said first and second locating means, to transmit to the latter the reaction of low pressure actuating fluid on said other fluid power element to actuate said high pressure pump to force high pressure fluid into said hydraulic clamp to clamp said spindle against axial displacement in said spindle sleeve.

9. A machine tool comprising, in combination, a machining head including support means, a rotary spindle support sleeve, precision bearing means supported on said support means and encircling said spindle support sleeve, first locating means on said support means engaging said precision bearing means to locate the latter in an exact axial position, second locating means on said spindle sleeve engaging said bearing means to locate the spindle sleeve in an exact axial position with reference to said bearing means so that the bearing means in conjunction with said first and second locating means locates the spindle sleeve in an exact axial position in relation to said support means, a machining spindle slidably disposed in said spindle sleeve for rotation therewith and for longitudinal adjustment therein to extend to a varying degree beyond the spindle sleeve, said spindle having working element support means thereon, a high pressure hydraulic clamp carried with said spindle sleeve releasably to clamp the sleeve and the spindle in longitudinally immovable relation to each other, said spindle sleeve having thereon a high pressure pump rotatable therewith, said high pressure pump being connected to said hydraulic clamp, first and second fluid power elements encircling said spindle and mutually overlapping each other in axially slidable relation to each other to define an expandable annular cylinder space for low pressure actuating fluid encircling said spindle, said spindle sleeve having means thereon defining a cylindrical surface and a low pressure fluid supply passage communicating with said expandable annular cylinder space and including a low pressure supply port opening through said cylindrical surface, a nonrotatable fluid supply collar encircling said cylindrical surface and having a generally cylindrical inner periphery which has a running fit around said cylindrical surface, said collar defining in said inner periphery thereof an annular fluid supply groove encircling said cylindrical surface in confronting relation to said supply port, means connecting a source of energizing fluid under low pressure with said annular collar groove to supply low pressure actuating fluid therethrough and through said supply port to said cylinder space to react forcibly in opposite directions on said respective fluid power elements, said fluid supply collar defining on each side of said annular groove a plurality of circumferentially spaced cavities confronting said cylindrical surface to define therewith hydrostatic bearing spaces effectively isolated from each other and from said annular groove by the running fit of said inner periphery of said collar with said cylindrical surface, fluid supply means connected to each of said respective hydrostatic bearing spaces to supply fluid thereto at a pressure that is inversely proportional to the rate at which fluid is supplied to the bearing space so that the instantaneous fluid pressures in said respective bearing spaces are inversely proportional to the degree of running clearance existing between corresponding contiguous portions of said collar and said cylindrical surface; one of said fluid power elements being interconnected with said spindle sleeve, independently of said precision bearing means and said first and second locating means, to transmit to the spindle sleeve the reaction of low pressure actuating fluid on said one fluid power element; and the other of said fluid power elements reacting on said high pressure pump, independently of said precision bearing means and said first and second locating means, to transmit to the latter the reaction of low pressure actuating fluid on said other fluid power element to actuate said high pressure pump to force high pressure fluid into said hydraulic clamp to clamp said spindle against axial displacement in said spindle sleeve.

10. A machine tool comprising, in combination, a machining head including support means, a rotary spindle support sleeve having an outer end, precision bearing means supported on said support means and encircling said spindle support sleeve to support the latter for rotation, first locating means on said support means engaging said precision bearing means to locate the latter in an exact axial position, second locating means on said spindle sleeve engaging said bearing means to locate the spindle sleeve in an exact axial position with reference to said bearing means so that the bearing means in conjunction with said first and second locating means locates the spindle sleeve in an exact axial position in relation to said support means, a machining spindle slidably disposed in said spindle sleeve for rotation therewith and for longitudinal adjustment therein to project to a varying degree beyond said outer end of the spindle sleeve, said spindle having working element support means on the projecting end thereof, a high pressure hydraulic clamp carried by said spindle sleeve to clamp an adjacent portion of said spindle, said spindle sleeve defining a high pressure cylinder axially spaced from said hydraulic clamp and from said second locating means, said spindle sleeve defining a high pressure fluid passage connecting said high pressure cylinder to said hydraulic clamp, a high pressure piston slidably disposed in said high pressure cylinder, a first fluid power element defining a cylinder for low pressure operating fluid, a low pressure piston slidably disposed in said low pressure cylinder and constituting a second fluid power element, said spindle sleeve having means thereon defining a cylindrical surface and two low pressure fluid supply passages commnicating with said cylinder on opposite sides of said piston and including respectively low pressure supply ports opening through said cylindrical surface, a nonrotatable fluid supply element encircling said cylindrical surface and having a generally cylindrical inner periphery which has a running fit around said cylindrical surface, said supply element defining in said inner periphery thereof two juxtaposed annular fluid supply grooves encircling said cylindrical surface in confronting relation to said respective supply ports, low pressure fluid supply means connected with said respective annular grooves to supply low pressure actuating fluid therethrough to opposite ends of said low pressure cylinder selectively to urge said low pressure piston in opposite directions, said supply element defining on each side of said juxtaposed grooves therein a plurality of circumferentially spaced cavities confronting said cylindrical surface to define therewith hydrostatic bearing spaces effectively isolated from each other and from said annular grooves by the running fit of said inner periphery of said supply element with said cylindrical surface, fluid supply means including a plurality of pressure reducing passages connected to said respective hydrostatic bearing spaces and including means for supplying fluid through said passages to said respective bearing spaces at pressures that vary inversely with the rates of flow to said respective spaces so that the reactions on said supply element of fluid pressures in said bearing spaces automatically compensate for incipient radial misalignment of said supply element and said cylindrical surface to sustain the supply element out of contact with the cylindrical surface; one of said fluid power elements coacting with said high pressure piston to urge the latter reversibly in a spindle clamping direction for expressing high pressure fluid from said high pressure cylinder into said hydraulic clamp to clamp said spindle against axial displacement in said spindle sleeve; and the other of said fluid power elements being interconnected with said spindle sleeve, independently of said precision bearing means and said first and second locating means, to transmit to the spindle sleeve the reaction of low pressure fluid on said other fluid power element.

11. A machine tool comprising, in combination, a machining head including support means, a rotary spindle support sleeve, precision bearing means supported on said support means and encircling said spindle support sleeve, first locating means on said support means engaging said precision bearing means to locate the latter in an exact axial position, second locating means on said spindle sleeve engaging said bearing means to locate the spindle sleeve in an exact axial position with reference to said bearing means so that the bearing means in conjunction with said first and second locating means locates the spindle sleeve in an exact axial position in relation to said support means, a machining spindle slidably disposed in said spindle sleeve for rotation therewith and for longitudinal adjustment therein, adjusting means coacting with said spindle to move the latter axially to various positions of longitudinal adjustment, said spindle having working element support means thereon, a high pressure hydraulic clamp carried with said spindle sleeve releasably to clamp the sleeve and the spindle in longitudinally immovable relation to each other, a high pressure pump rotatable with said spindle sleeve and connected to said hydraulic clamp to apply the latter, a low pressure fluid motor rotatable with said spindle sleeve and coacting with said high pressure pump to apply actuating force to the latter, low pressure actuating fluid supply means communicating with said low pressure fluid motor to supply low pressure actuating fluid thereto to energize said low pressure fluid motor to actuate said high pressure pump to apply said hydraulic clamp; and said hydraulic clamp, said spindle sleeve, said high pressure pump, and said low pressure fluid motor being mutually interconnected, independently of said precision bearing means and said first and second locating means, to transmit therebetween, independently of said precision bearing means and said first and second locating means, the axial forces of fluid pressure on said hydraulic clamp, said spindle sleeve, said high pressure pump and said low pressure fluid motor.

12. A machine tool comprising, in combination, a machining head including support means, a rotary spindle support sleeve, precision bearing means supported on said support means and encircling said spindle support sleeve, first locating means on said support means engaging said precision bearing mean to locate the latter in an exact axial position, second locating means on said spindle sleeve engaging said bearing means to locate the spindle sleeve in an exact axial position with reference to said bearing means to locate the spindle sleeve in an exact axial position with reference to said bearing means so that the bearing means in conjunction with said first and second locating means locates the spindle sleeve in an exact axial position in relation to said support means, a machining spindle slidably disposed in said spindle sleeve for rotation therewith and for longitudinal adjustment therein, adjusting means coacting with said spindle to move the latter axially to various positions of longitudinal adjustment, said spindle having working element support means thereon, a high pressure hydraulic clamp rotatable with said spindle sleeve releasably to clamp the sleeve and the spindle in longitudinally immovable relation to each other, a high pressure pump rotatable with said spindle sleeve and connected to said hydraulic clamp to apply the latter, a low pressure fluid motor rotatable with said spindle sleeve and coacting with said high pressure pump to apply actuating force to the latter, said spindle sleeve having means thereon defining a cylindrical surface and a low pressure fluid supply passage communicating with said low pressure fluid motor and including a low pressure supply port opening through said cylindrical surface, a nonrotatable fluid supply element encircling said cylindrical surface and having a generally cylindrical inner periphery which has a running fit around said cylindrical surface, said supply element defining in said inner periphery thereof an annular fluid supply groove encircling said cylindrical surface in confronting relation to said supply port, low pressure fluid supply means connected with said annular groove to supply low pressure actuating fluid therethrough to said low pressure fluid motor to energize said low pressure fluid motor to actuate said high pressure pump to apply said hydraulic clamp, said supply element defining on each side of said annular groove therein a plurality of circumferentially spaced cavities confronting said cylindrical surface to define therewith hydrostatic bearing spaces effectively isolated from each other and from said annular groove by the running fit of said inner periphery of said supply element with said cylindrical surface, fluid supply means for supplying fluid to each of said respective hydrostatic bearing spaces under a pressure that varies inversely with the rate of fluid flow to the respective spaces so that fluid under pressure in said spaces reacts on said cylindrical surface and said supply element to sustain the latter out of contact with said cylindrical surface, and said hydraulic clamp, said spindle sleeve, said high pressure pump, and said low pressure fluid motor being mutually interconnected, independently of said precision bearing means and said first and second locating means, to transmit therebetween, independently of said precision bearing means and said first and second locating means, the axial forces of fluid pressure on said hydraulic clamp, said spindle sleeve, said high pressure pump and said low pressure fluid motor.

13. A machine tool comprising, in combination, a machining head including support means, a rotary spindle support sleeve having an outer end, precision bearing means supported on said support means and encircling said spindle support sleeve adjacent said outer end thereof to support the sleeve for rotation, first locating means on said support means engaging said precision bearing means to locate the latter in an exact axial position, second locating means rigid with said spindle sleeve in axially proximate relation to said bearing means and engaging said bearing means to locate said outer end of the spindle sleeve in an exact axial position with reference to said bearing means so that the bearing means in conjunction with said first and second locating means locates the outer end of the spindle sleeve in an exact axial position in relation to said support means, a machining spindle slidably disposed in said spindle sleeve for rotation therewith and for longitudinal adjustment therein to project to a varying degree beyond said outer end of the spindle sleeve, said spindle having working element support means on the projecting end thereof, a high pressure hydraulic clamp carried by said spindle sleeve to clamp an adjacent portion of said spindle releasably to hold said spindle in axially immovable relation to the spindle sleeve, a high pressure pump rotatable with said spindle sleeve and connected to said hydraulic clamp to apply the latter, a low pressure fluid motor rotatable with said spindle sleeve and coacting with said high pressure pump to apply actuating force to the latter, low pressure actuating fluid supply means communicating with said low pressure fluid motor to supply low pressure actuating fluid thereto to energize said low pressure fluid motor to actuate said high pressure pump to apply said hydraulic clamp; and said hydraulic clamp, said spindle sleeve, said high pressure pump, and said low pressure fluid motor being mutually interconnected, independently of said precision bearing means and said first and second locating means, to transmit therebetween, independently of said precision bearing means and said first and second locating means, the axial forces of fluid pressure on said hydraulic clamp, said spindle sleeve, said high pressure pump and said low pressure fluid motor.

14. A machine tool comprising, in combination, a machining head including support means, a rotary spindle support sleeve, precision bearing means supported on said support means and encircling said spindle support sleeve, first locating means on said support means engaging said precision bearing means to locate the latter in an exact axial position, second locating means on said spindle sleeve engaging said bearing means to locate the spindle sleeve in an exact axial position with reference to said bearing means so that the bearing means in conjunction with said first and second locating means locates the spindle sleeve in an exact axial position in relation to said support means, a machining spindle slidably disposed in said spindle sleeve for rotation therewith and for longitudinal adjustment therein, adjusting means coacting with said spindle to move the latter axially to various positions of longitudinal adjustment, said spindle having working element support means thereon, a high pressure hydraulic clamp rotatable with said spindle sleeve releasably to clamp the sleeve and the spindle in longitudinally immovable relation to each other, a high pressure pump rotatable with said spindle sleeve and connected to said hydraulic clamp to apply the latter, a low pressure fluid motor rotatable with said spindle sleeve and coacting with said high pressure pump to apply actuating force to the latter, said spindle sleeve having a first member thereon defining a generally cylindrical surface of revolution and a first fluid passage communicating with said low pressure fluid motor, a nonrotatable second member encircling said surface of revolution on said first member and having a circular inner periphery which has a running fit around said surface of revolution, said second member defining a second fluid passage therein, one of said members defining an annular groove communicating with said passage in the one member and confronting the other of said members, said other member defining a port communicating with said passage in said other member and confronting said annular groove in said one member to establish continuous communication through said port and said groove between said first and second passages; low pressure fluid supply means connected with said second passage in said second member to supply low pressure actuating fluid through said second passage, said port, said groove, and said first passage to said low pressure fluid motor to energize said low pressure fluid motor to actuate said high pressure pump to apply said hydraulic clamp; said second member defining alongside said annular groove a plurality of circumferentially spaced cavities confronting said surface of revolution to define therewith hydrostatic bearing spaces effectively isolated from each other, said annular groove, and said port by the running fit of said inner periphery of said second member with said surface of revolution; fluid supply means supplying fluid under pressure to said respective hydrostatic bearing spaces so that fluid under pressure in said spaces reacts on said surface of revolution and said second member to sustain the latter out of rubbing contact with said surface of revolution; and said hydraulic clamp, said spindle sleeve, said high pressure pump, and said low pressure fluid motor being mutually interconnected, independently of said precision bearing means and said first and second locating means, to transmit therebetween, independently of said precision bearing means and said first and second locating means, the axial forces of fluid pressure on said hydraulic clamp, said spindle sleeve, said high pressure pump and said low pressure fluid motor.

References Cited

UNITED STATES PATENTS

| | | |
|---|---|---|
| 2,957,393 | 10/1960 | Kampmeir. |
| 3,034,408 | 5/1962 | Kampmeir. |
| 3,200,671 | 8/1965 | Porath. |
| 3,211,060 | 10/1965 | McCann. |

GIL WEIDENFELD, Primary Examiner

U.S. Cl. X.R.

90—16; 285—190